(12) United States Patent
Miyamoto et al.

(10) Patent No.: US 6,203,431 B1
(45) Date of Patent: Mar. 20, 2001

(54) VIDEO GAME APPARATUS AND MEMORY MEDIUM USED THEREFOR

(75) Inventors: Shigeru Miyamoto; Yoshiaki Koizumi; Toru Osawa; Yoichi Yamada; Toshio Iwawaki; Tsuyoshi Kihara, all of Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/190,240

(22) Filed: Nov. 13, 1998

(30) Foreign Application Priority Data

Nov. 14, 1997 (JP) .................................... 9-313157

(51) Int. Cl.[7] .............................. A63F 13/00; A63F 9/24; G06F 17/00; G06F 19/00
(52) U.S. Cl. ................................ 463/31; 463/37; 463/38; 463/44; 463/45; 463/47; 463/43; 711/100; 711/101; 711/115; 345/131; 345/419; 345/426; 345/473; 345/950; 345/955; 345/192
(58) Field of Search .................................. 463/31, 43, 37, 463/44, 32, 45, 33, 47, 38; 711/115, 100, 101; 345/418, 419, 426, 473, 131, 133, 192, 950, 952, 955

(56) References Cited

U.S. PATENT DOCUMENTS

| | | | |
|---|---|---|---|
| 4,600,919 | * 7/1986 | Stern ................................. | 340/725 X |
| 4,752,836 | * 6/1988 | Blanton et al. ................... | 358/342 X |
| 4,952,922 | * 8/1990 | Griffin et al. ..................... | 340/729 X |
| 5,261,041 | * 11/1993 | Susman ............................. | 395/152 X |
| 5,577,175 | * 11/1996 | Naka et al. ....................... | 395/127 X |
| 5,768,415 | * 6/1998 | Jagadish et al. ................. | 382/154 X |
| 5,838,330 | * 11/1998 | Ajima ................................. | 345/427 |
| 5,846,131 | * 12/1998 | Kitahara ............................ | 463/29 X |
| 5,882,262 | * 3/1999 | Ballhorn ............................. | 463/43 |
| 5,909,218 | * 6/1999 | Naka et al. ....................... | 345/419 X |
| 6,007,428 | * 12/1999 | Nishiumi et al. .................. | 463/36 X |
| 6,030,292 | * 2/2000 | Hirano et al. ..................... | 463/43 X |
| 6,031,538 | * 2/2000 | Chupeau et al. ................. | 345/419 |
| 6,034,930 | * 3/2000 | Kitahara ............................ | 369/47 X |
| 6,045,447 | * 4/2000 | Yoshizawa et al. .............. | 463/31 X |

* cited by examiner

Primary Examiner—Jessica J. Harrison
Assistant Examiner—Binh-An Nguyen
(74) Attorney, Agent, or Firm—Nixon & Vanderhye P.C.

(57) ABSTRACT

A video game apparatus includes an external ROM. This external ROM is previously memorized with player object data, basic shadow object data and light object data. A direction in which a shadow is thrown is determined according to the player object data and the light object data, to thereby determine a length of each leg of the player object. Based on the length of the leg and the height of the light, a length of the shadow is determined. Based on the height of each leg, a depth of the shadow is determined. A shape of a displaying shadow object is determined from a state of a ground object to which the shadow is thrown.

17 Claims, 21 Drawing Sheets

DETAIL OF IMAGE DATA AREA 203

FIG. 15

| |
|---|
| ANIMATION 1<br>    LEFT LEG LENGTH =20   RIGHT LEG LENGTH =20 |
| ANIMATION 2<br>    LEFT LEG LENGTH =20   RIGHT LEG LENGTH =15 |
| ANIMATION 3<br>    LEFT LEG LENGTH =20   RIGHT LEG LENGTH =10 |
| ANIMATION 4<br>    LEFT LEG LENGTH =20   RIGHT LEG LENGTH =5 |
| ANIMATION 5<br>    LEFT LEG LENGTH =20   RIGHT LEG LENGTH =10 |
| ANIMATION 6<br>    LEFT LEG LENGTH =20   RIGHT LEG LENGTH =15 |
| ANIMATION 7<br>    LEFT LEG LENGTH =20   RIGHT LEG LENGTH =20 |
| ANIMATION 8<br>    LEFT LEG LENGTH =15   RIGHT LEG LENGTH =20 |
| ANIMATION 9<br>    LEFT LEG LENGTH =20   RIGHT LEG LENGTH =20 |
| ANIMATION 10<br>    LEFT LEG LENGTH =5    RIGHT LEG LENGTH =20 |
| ANIMATION 11<br>    LEFT LEG LENGTH =10   RIGHT LEG LENGTH =20 |
| ANIMATION 12<br>    LEFT LEG LENGTH =25   RIGHT LEG LENGTH =20 |

FIG. 18
WHEN LIFTING RIGHT LEG      WHEN LIFTING LEFT LEG
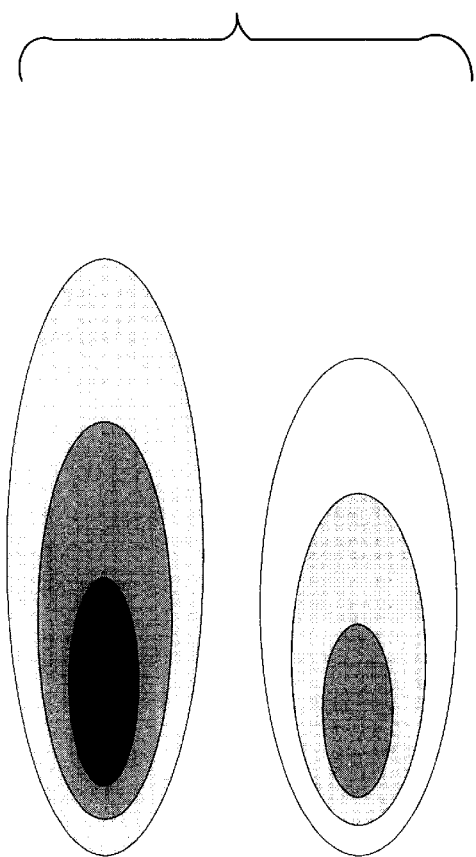
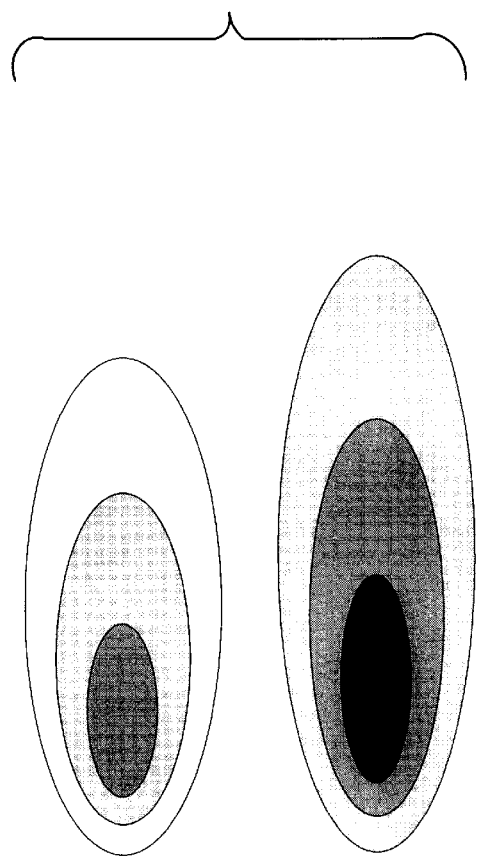

VIDEO GAME APPARATUS AND MEMORY MEDIUM USED THEREFOR

BACKGROUND OF THE INVENTION

1. Field of the Invention

This invention relates to video game apparatuses and memory mediums. More specifically, the invention relates to a video game apparatus for processing shadows to be displayed by an improved method, and a memory medium used therefor.

2. Description of the Prior Art

In so-called "3D games" a player object is moved in a three-dimensional virtual space. In such a case, a shadow of the player object is displayed on a ground object (a floor, water surface, earth surface, etc.) thus enhancing three-dimensional realistic feelings.

The conventional methods of displaying player object shadows involve one to put a circular shadow to a location of directly under the player object. However, in this method the shadows are simply in circular forms regardless of the scene, resulting in deficiency in realistic feelings.

Under such a circumstance, another method has been adopted that the polygon data for the player object is calculated and then put to a ground object through planation.

However, this method requires to calculate polygons in the same number as that of the player object, resulting in a problem of excessive quantity of calculation and hence heavy burden on a game processor. Accordingly, where realizing this method by using an image processing apparatus with low processing speed, such as a home-use game machine, there encounters a limitation in displaying an object shadow to at most one in number.

SUMMARY OF THE INVENTION

Therefore, it is a primary object of the present invention to provide a shadow displaying method which is capable of reducing the burden on a processor and enhancing the realistic feeling.

It is another object of the present invention to provide a video game apparatus which can display shadows in a variety of forms through easy calculations.

A method for displaying a shadow with a video game apparatus according to the present invention, includes the steps of: (a) generating basic shadow object data; (b) deforming the basic shadow object data to create displaying shadow object data according to at least position data of a light and player object data; and (c) supplying an image signal to a display unit based on at least the player object data on a player object and the displaying shadow object data.

A video game apparatus according to the present invention, comprises: a basic object data generating means for generating basic shadow object data; a player object image data generating means for generating a player object data; a displaying shadow object data creating means for deforming the basic shadow object data to create displaying shadow object data according to at least the player object data and position data on a light for illuminating the player object; and an image processing means for supplying an image signal to a display unit based on at least the player object data and the displaying shadow object data.

Further, a memory medium according to the present invention is to be detachably attached to a video game apparatus for displaying a shadow of a player object, and comprises: a first memory area for generating basic shadow object data; a second memory area for generating player object data; a displaying shadow object creating program for deforming the basic shadow object data to create displaying shadow object data according to at least the player object data and position data of a light for illuminating the player object; and an image processing program for supplying an image signal to a display unit based on at least the player object image data and displaying shadow object data.

For example, a circular basic shadow object is formed by two polygons and textures to be put thereto. This basic shadow object is deformed depending, for example, upon a light position, ground object state (a position, inclination, step, material (water, soil, etc.)), or player object position or its ground contact portion, being created into a displaying shadow object.

The creation of a display shadow object, in concrete, involves determining a direction in which a shadow is thrown, determining a shadow length based on a light source height and a player object leg length, determining a shadow depth based on a foot height, and determining a shape of a displaying shadow object depending on a state of a ground object to which the shadow is thrown.

When the player object has two legs, displaying shadow objects are created for each leg.

In the present invention, because a displaying shadow object is created by deforming a basic shadow object, the burden on the processor is reduced. Further, shadows are represented by being varied in various forms instead of simple shapes of shadows.

Also, when the player object has two legs and the two legs are displayed with respective shadows, the shadows are varied matching to left and right leg movements, thus providing shadow representation with greater realism.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 15 is an illustrative view showing one example of an animation table;

FIG. 18 is an illustrative view showing shadow depth to be varied depending upon leg height;

DETAILED DESCRIPTION OF ONE PREFERRED EMBODIMENT

Figure 1:
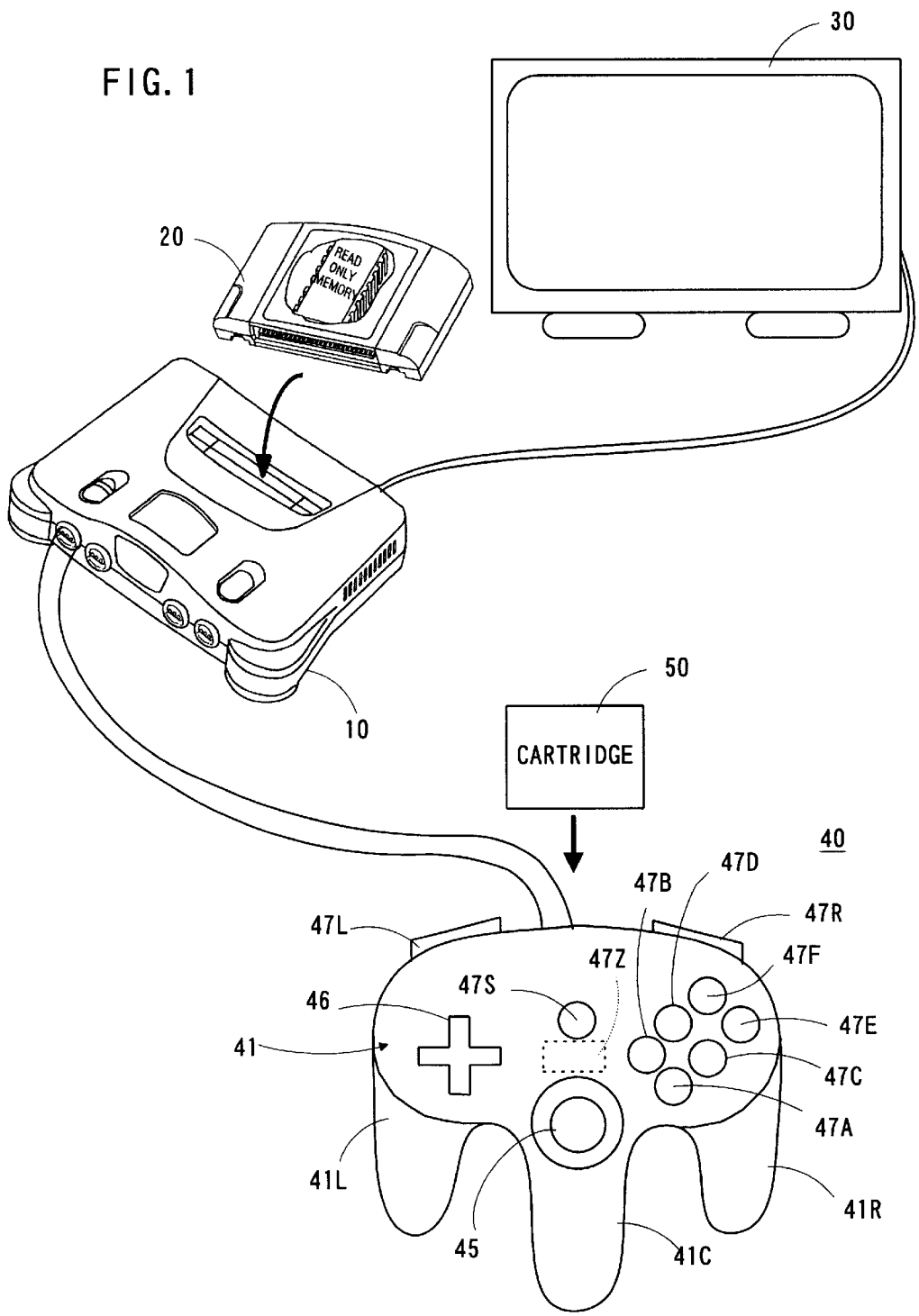
FIG. 1 is a schematic illustrative view showing a video game system according to one embodiment of the present invention.

Referring to FIG. 1, a video game system in this embodiment includes a video game machine 10, a ROM cartridge 20 as one example of a memory medium, a display unit 30 connected to the video game machine 10, and a controller 40. The controller 40 is dismountably mounted with a cartridge 50.

The controller 40 is structured by a plurality of switches or buttons provided on the housing 41 in a form graspable by both or one hand. Specifically, the controller 40 includes handles 41L, 41C, 41R downwardly extending respectively from a left end, a right end and a center of the housing 41, providing an operation area on a top surface of the housing 41. In the operation area, there are provided an analog-inputtable joystick (hereinafter referred to as "analog joystick") 45 at a central lower portion thereof, a cross-shaped digital direction switch (hereinafter called "cross switch") 46 on the left side, and a plurality of button switches 47A, 47B, 47D, 47E and 47F on the right side.

The analog joystick 45 is used to input moving directions and/or moving speeds or moving amounts of the player object as determined by an amount and direction of joystick inclination. The cross switch 46 is used to designate a moving direction of the player object, in place of the joystick 45. The button switches 47A and 47B are used to designate a motion of the player object. Button switches 47C–47D are used to switch over a sight point for a three-dimension image camera or to adjust the speed or the like of the player object.

A start switch 47S is provided almost at a center of the operation area. This start switch 47S is operated when starting a game. A switch 47Z is provided at a backside of the central handle 41C. This switch 47Z is utilized, for example, as a trigger switch in a shoot game. This switch (may be hereinafter called "Z button") 47Z is operated when the player object is to be caused to pay attention to a non-player object. That is, this switch 47Z functions as a second operating means. Switches 47L and 47R are provided at upper left and right of a lateral surface of the housing 41.

Incidentally, the above-stated button switches 47C–47F can also be used to control the moving speed (e.g. acceleration or deceleration) of the player object in a shoot or action game, besides for the purpose of switching the camera visual point. However, these switches 47A–47F, 47S, 47Z, 47L and 47R can be arbitrarily defined in their function depending upon a game program.

Figure 2:
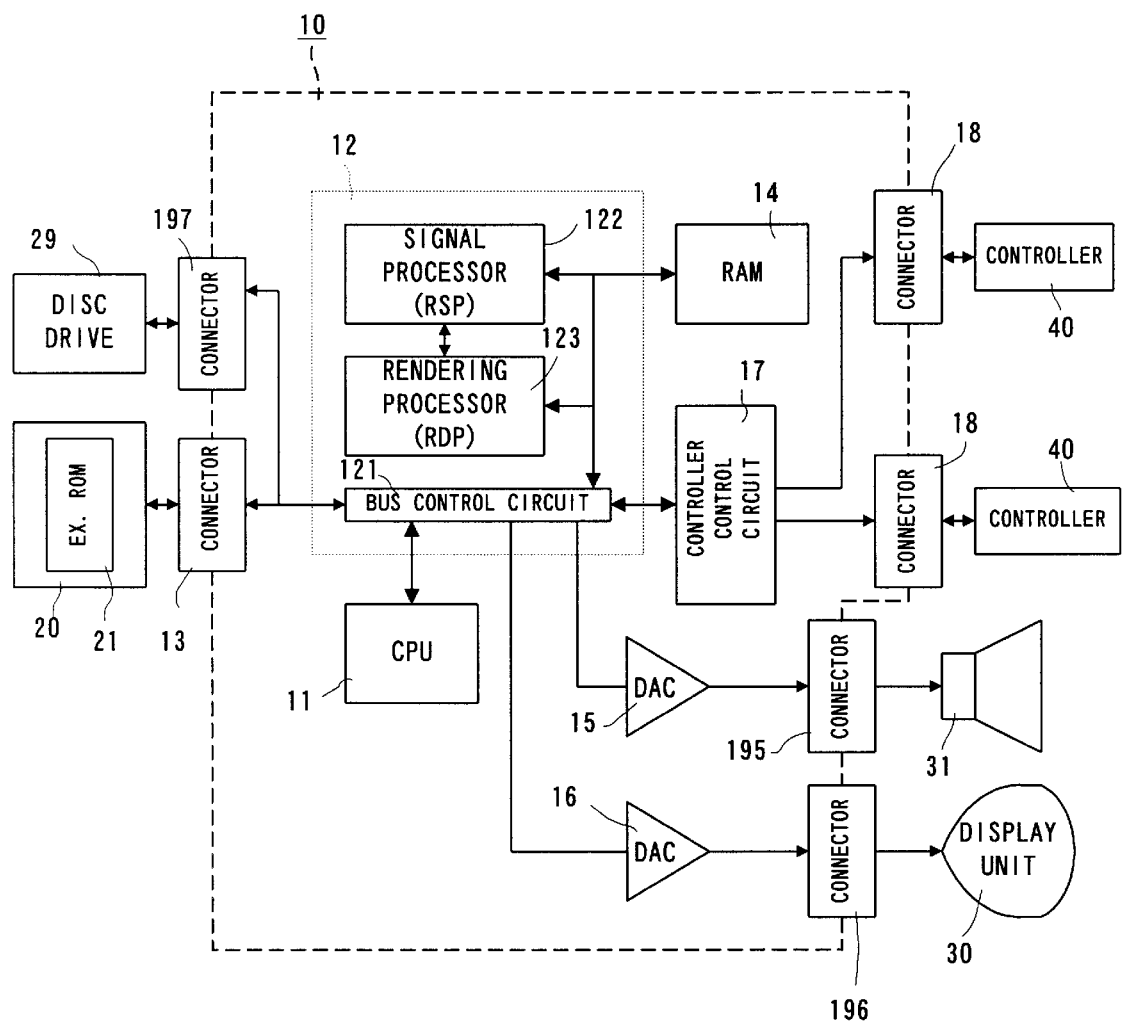
FIG. 2 is a block diagram showing in detail a video game machine in FIG. 1.

FIG. 2 is a block diagram of the video game system of the FIG. 1 embodiment. The video game machine 10 incorporates therein a central processing unit (hereinafter referred to as "CPU") 11 and a coprocessor (reality coprocessor: hereinafter referred to as "RCP") 12. The RCP 12 includes a bus control circuit 121 for controlling buses, a signal processor (reality signal processor; hereinafter referred to as "RSP") 122 for performing polygon coordinate transformation, shading treatment and so on, and a rendering processor (reality display processor; hereinafter referred to as "RDP") 46 for rasterizing polygon data into an image to be displayed and converting the same into a data form (dot data) memorable on a frame memory.

The RCP 12 is connected with a cartridge connector 13 for unloadably loading a ROM cartridge 20 having an external ROM 21 incorporated therein, a disc-drive connector 197 for detachably mounting a disc drive 29, and a RAM 14. Also, the RCP 12 is connected with DAC (Digital/Analog Converters) 15 and 16 for respectively outputting a sound signal and video signal to be processed by the CPU 11. Further, the RCP 12 is connected with a controller control circuit 17 to serially transfer operating data on one or a plurality of controllers 40 and/or data of the cartridge 50.

The bus control circuit 121 included in the RCP 12 performs parallel/serial conversion on a command supplied in a parallel signal from the CPU via a bus, to thereby supply a serial signal to the controller control circuit 18. Also, the bus control circuit 121 converts a serial signal inputted from the controller control circuit 17 into a parallel signal, giving an output to the CPU 11 via the bus. The data representative of an operating state (operating signal or operating data) read out of the controller 40A–40D is processed by the CPU 11, and temporarily stored within a RAM 14, and so on. In other words, the RAM 15 includes a storage site for temporarily memorizing the data to be processed by the CPU 11, so that it is utilized for smoothly reading and writing data through the bus control circuit 121.

The sound DAC 15 is connected with a connector 195 provided at a rear face of the video game machine 10. The image DAC 16 is connected with a connector 196 provided at the rear face of the video game machine 10. The connector 195 is connected with a speaker 31 of a display 30, while the connector 196 is connected with a display 30 such as a TV receiver, CRT or LCD.

The controller control circuit 17 is connected with a controller connector provided at the front face of the video game machine 10. The connector 18 is disconnectably connected by a controller 40 through a connecting jack. The connection of the controller 40 to the connector 18 places the controller in electrical connection to the video game machine 10, thereby enabling transmission/reception or transfer of data therebetween.

Figure 3:
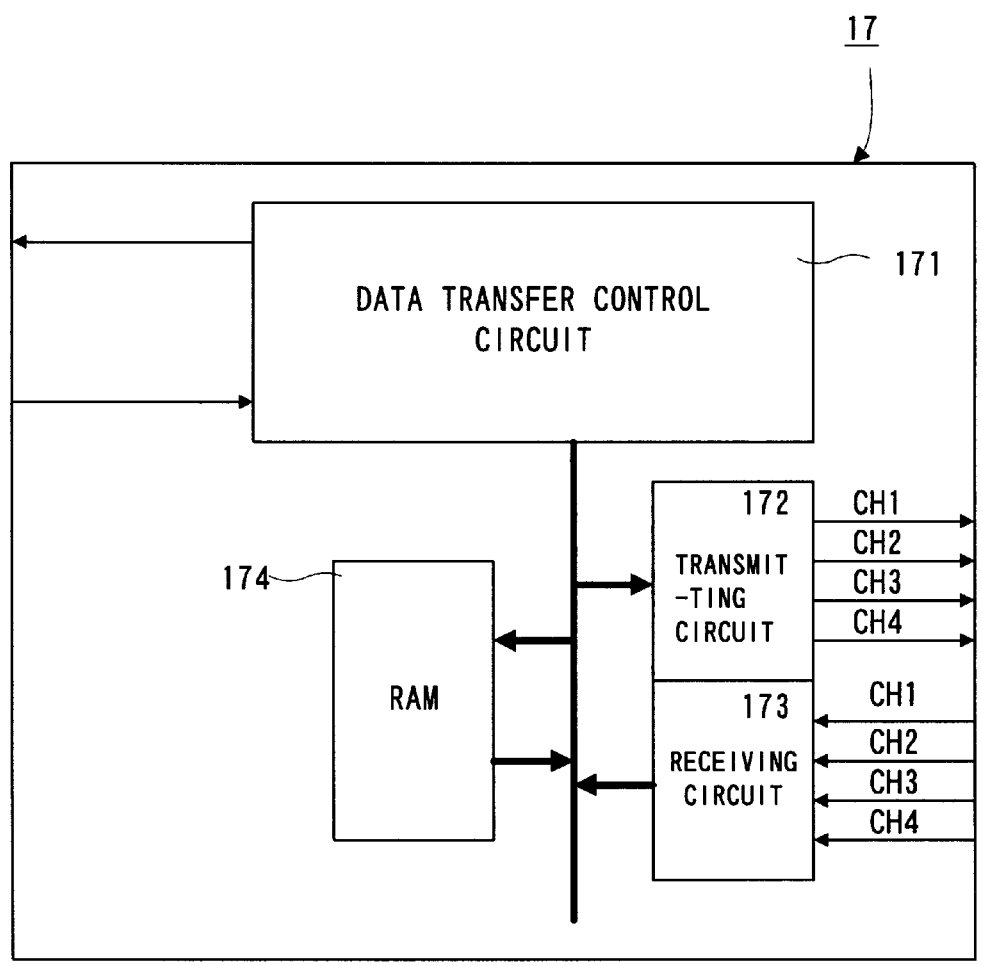
FIG. 3 is a block diagram showing in further detail a controller control circuit in FIG. 2.

The controller control circuit 17 is used to transmit and receive data in serial between the RCP 12 and the connector 18. The controller control circuit 17 includes, as shown in FIG. 3, a data transfer control circuit 171, a transmitting circuit 172, a receiving circuit 173 and a RAM 174 for temporarily memorizing transmission and reception data. The data transfer control circuit 171 includes a parallel/serial converting circuit and a serial/parallel converting circuit in order to convert a data format during data transfer, and further performs write/read control on the RAM 174. The serial/parallel converting circuit converts the serial data supplied from the RCP 12 into parallel data, supplying it to the RAM 174 or the transmitting circuit 172. The parallel/serial converting circuit converts the parallel data supplied from the RAM 174 or the receiving circuit 173 into serial data, to supply it to the RCP 12. The transmitting circuit 172 converts the command for reading signals from the controller 40 and the writing data (parallel data) to the cartridge 50, into serial data to be delivered to channels CH1–CH4 corresponding to the respective controllers 40. The receiving circuit 173 receives, in serial data, operational state data of the controllers inputted through corresponding channels CH1–CH4 and data read from the cartridge 50, to convert them into parallel data to be delivered to the data transfer control circuit 171. The data transfer control circuit 171 writes into the RAM 174 data transferred from the RCP 12, data of the controller received by the receiving circuit 183, or data read out of the RAM cartridge 50, and reads data out of the RAM 174 based on a command from the RCP 12 so as to transfer it to the RCP 12.

The RAM 174, though not shown, includes memory sites for the respective channels CH1–CH4. Each of the memory sites is stored with a command for the channel, transmitting data and/or reception data.

Figure 4:
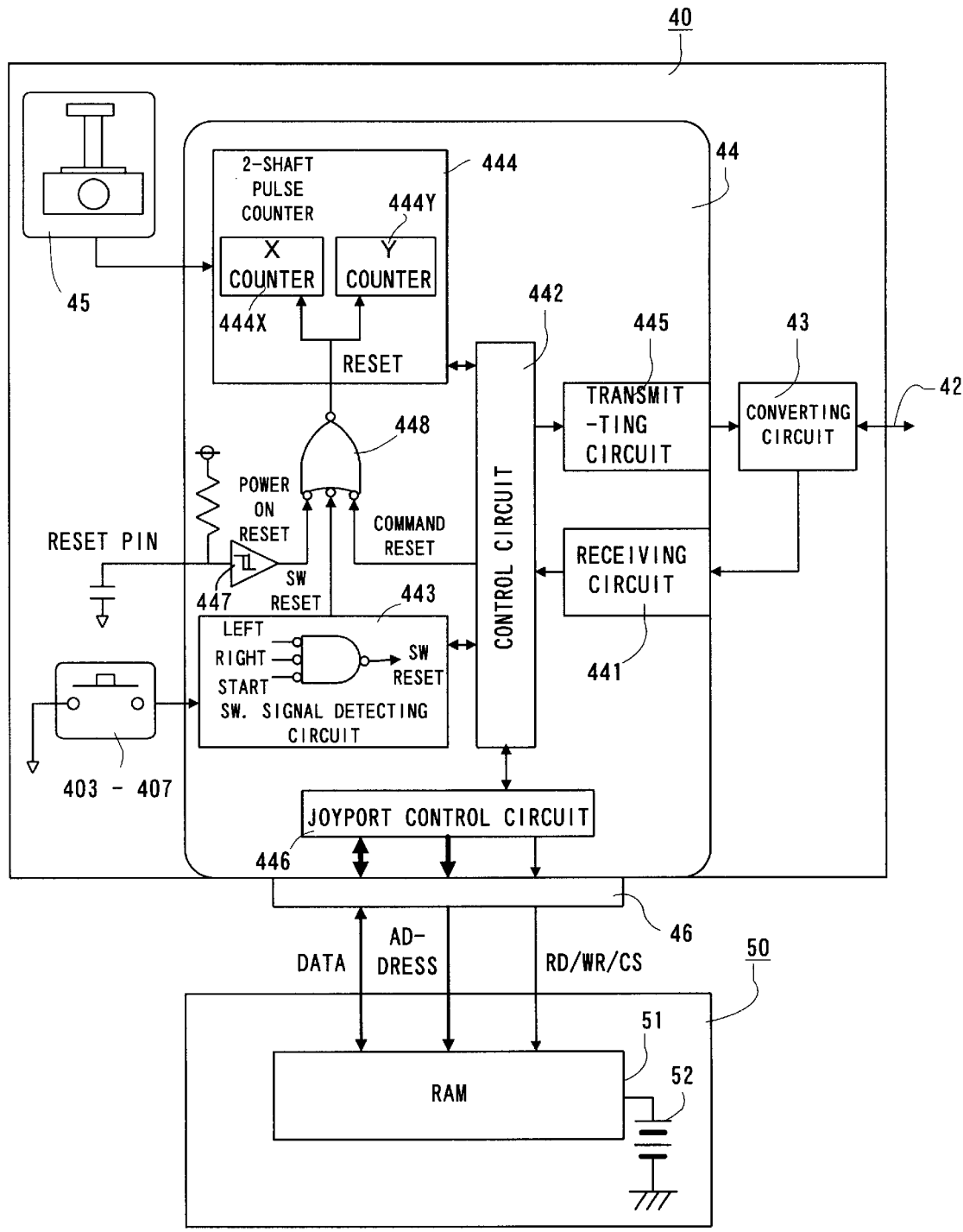
FIG. 4 is a block diagram showing in detail a controller and a cartridge in FIG. 1.

FIG. 4 is a detailed circuit diagram of the controller 40 and the cartridge 50. The housing of the controller 40 incorporates an operating signal processing circuit 44, etc. in order to detect an operating state of the joystick 45, switches 46, 47, etc. and transfer the detected data to the controller control circuit 17. The operating signal processing circuit 44 includes a receiving circuit 441, a control circuit 442, a switch signal detecting circuit 443, a counter circuit 444, a joyport control circuit 446, a reset circuit 447 and a NOR gate 448. The receiving circuit 441 converts a serial signal, such as a control signal transmitted from the controller control circuit 17 or writing data to the cartridge 50, into a parallel signal to supply it to the control circuit 442. The control circuit 442 generates a reset signal to reset (0), through the NOR gate 448, count values of an X-axis counter 444X and a Y-axis counter 444Y within the counter 444, when the control signal transmitted from the controller control circuit 17 is a signal for resetting X, Y coordinates of the joystick 45.

The joystick 45 includes X-axis and Y-axis photo-interrupters in order to decompose a lever inclination into X-axis and Y-axis components, generating pulses in number proportional to the inclination. The pulse signals are respectively supplied to the counter 444X and the counter 444Y. The counter 444X counts a number of pulses generated in response to an inclination amount when the joystick 45 is inclined in the X-axis direction. The counter 444Y counts a number of pulses generated responsive to an inclination amount when the joystick 45 is inclined in the Y-axis direction. Accordingly, the resultant X-axis and Y-axis vector determined by the count values of the counters 444X and 444Y serves to determine a moving direction and a coordinate position of the player object or hero character or a cursor. Incidentally, the counter 444X and the 444Y are reset, when a reset signal is supplied from the reset signal generating circuit 447 upon turning on the power or a reset signal is supplied from the switch signal detecting circuit 443 by simultaneous depression of predetermined two switches.

The switch signal detecting circuit 443 responds to a switch-state output command supplied at an interval of a constant period (e.g. a 1/30 second interval as a TV frame period) from the control circuit 442, to read a signal varying depending upon a depression state of the cross switch 46 and the switches 47A–47Z. The read signal is delivered to the control circuit 442. The control circuit 442 responds to a read-out command signal of operational state data from the controller control circuit 17 to supply in a predetermined data format the operational state data on the switches 47A–47Z and count values of the counters 444X and 444Y to the transmitting circuit 445. The transmitting circuit 445 converts the parallel signal outputted from the control circuit 442 into a serial signal, and transfer it to the controller control circuit 17 via a converting circuit 43 and a signal line 42. The control circuit 442 is connected with a joystick control circuit 446 via an address bus and a data bus as well as a port connector 46. The joyport control circuit 446 performs data input/output (or transmission/reception) control according to a command from the CPU 11 when the cartridge 50 is connected to the port connector 46.

The cartridge 50 is structured by connecting the RAM 51 to the address bus and data bus and connecting the RAM 51 with a battery 52. The RAM 51 is a RAM having a capacity (e.g. 256k bits), for example, of lower than a half of a maximum memory capacity accessible through the address bus. The RAM 51 is to store backup data in relation to a game, and saves backup data by the application of electric power from the battery 52 even if the cartridge 50 is withdrawn from the port connector 46.

Figure 5:
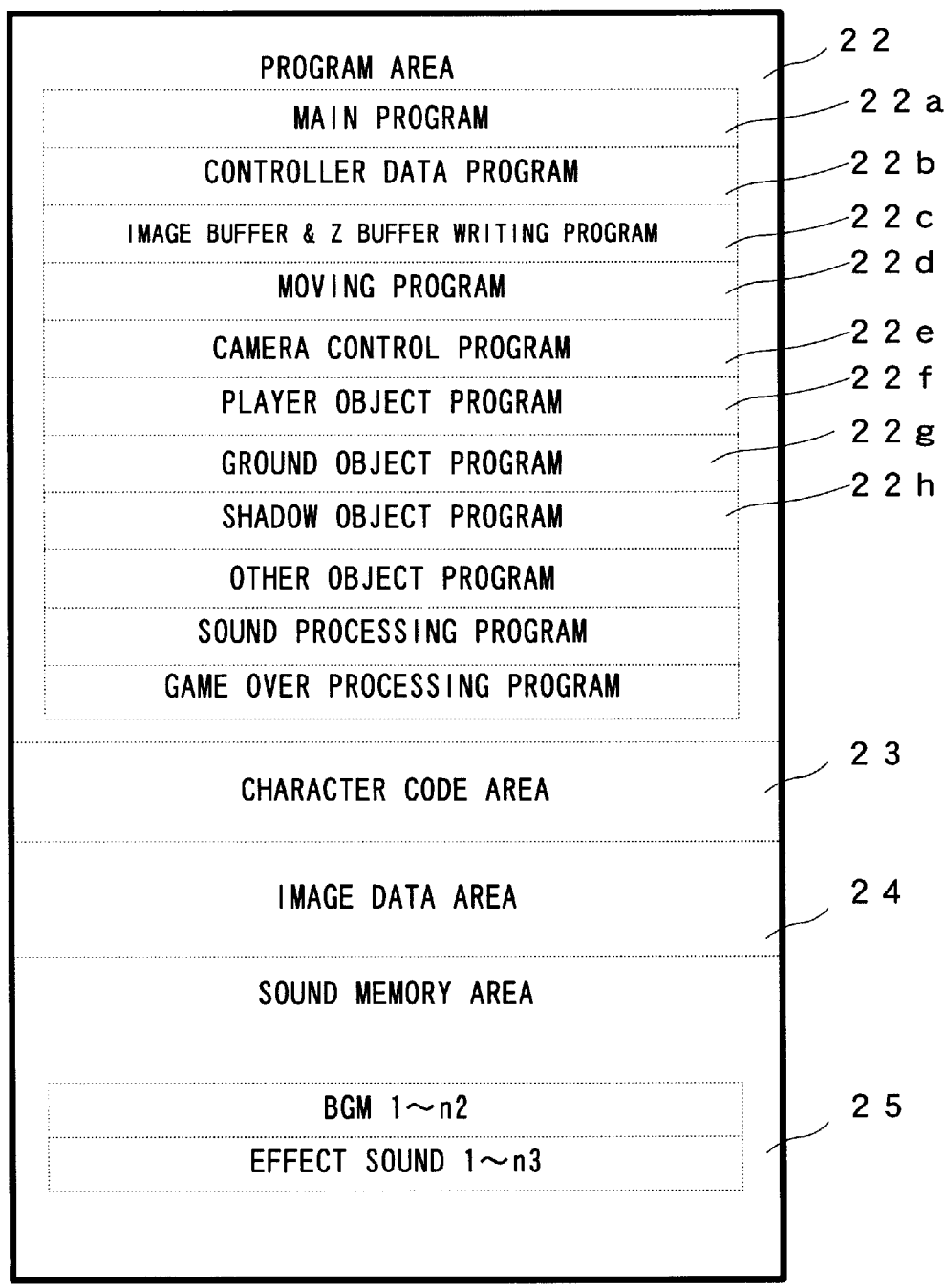
FIG. 5 is an illustrative view showing a memory map of an external ROM in FIG. 2.

FIG. 5 is a memory map showing a memory space of the external ROM 21 incorporated in the ROM cartridge 20 (FIG. 1). The external ROM 21 includes a plurality of memory areas (hereinafter referred to merely as "area"), for example, such as a program area 22, a character code area 23, an image data area 24 and a sound memory area 25, as shown in FIG. 5, thereby previously storing various program in a fixed manner.

The program area 22 is stored with programs required to process for game images, and game data and the like in accordance with a game content. Specifically, the program area 22 includes a plurality of memory areas to previously store operating programs for the CPU 11 in a fixed manner. A main program area 22a is stored with a main routine processing program, for example, for a game shown in FIG. 8 stated later. A controller data program area 22b is stored with a program for processing operational data on the controller 40. A write program area 22c is stored with a write program by which the CPU 11 causes the RCP 12 to perform writing into a frame memory and Z buffer. For example, the write program area 22c is stored with a program to write, into an image data area 203 (FIG. 6, FIG. 7) of the RAM 14, chrominance data as image data based on texture data for a plurality of movable objects or background objects to be displayed in one background scene. A move program area 22d is stored with a control program by which the CPU 11 causes the RCP 12 to vary the position of a moving body in a three-dimension space. A camera control program area 22e is stored with a camera control program that controls as to in which direction and/or position the movable objects including player object or the background objects are to be photographed in the three-dimension space. A player object program area 22f is stored with a program that controls, in displaying, an object operated by the player (player object). A ground object program area 22g is stored with a program to control, in displaying, a ground object (a ground, water surface, floor, etc.) on or above which the player object may stand or exist. A shadow object program area 22h is stored with a program to display a shadow of the player object on a ground object according to the data of a light object for illuminating the player object.

The character code area 23 is an area to store a plurality of kinds of character codes, e.g. a plurality of kinds of character dot data corresponding to the codes. The character code data memorized in the character code area 23 is utilized to display an instruction sentence to the player in the process of a game.

An image data area 24 is stored with image data, such as coordinate data of a plurality of polygons for each of the background object and/or movable objects, and texture data, and also a display control program to display these objects stationary at a predetermined position or in a moving state.

A sound memory area 25 is stored with sound data, such as phrases for outputting in sound the above message, effect sounds, game musics (BGM), etc., in a manner appropriate for a scene.

Incidentally, the memory medium or external memory device may use various kinds of memory mediums, such as CD-ROMs or magnetic discs, in place of or in addition to the ROM cartridge 20. In such a case, a disc drive 29 (FIG. 2) is provided in order to read or write, if required, various data (including program data and data for image presentation) for a game from or onto an optical or magnetical disc memory medium such as a CD-ROM or magnetic disc. The disc drive 29 reads data out of a magnetic disc or optical disc magnetically or optically memorizing program data similarly to the external ROM 21, and transfer the same data to the RAM 14.

Figure 6:
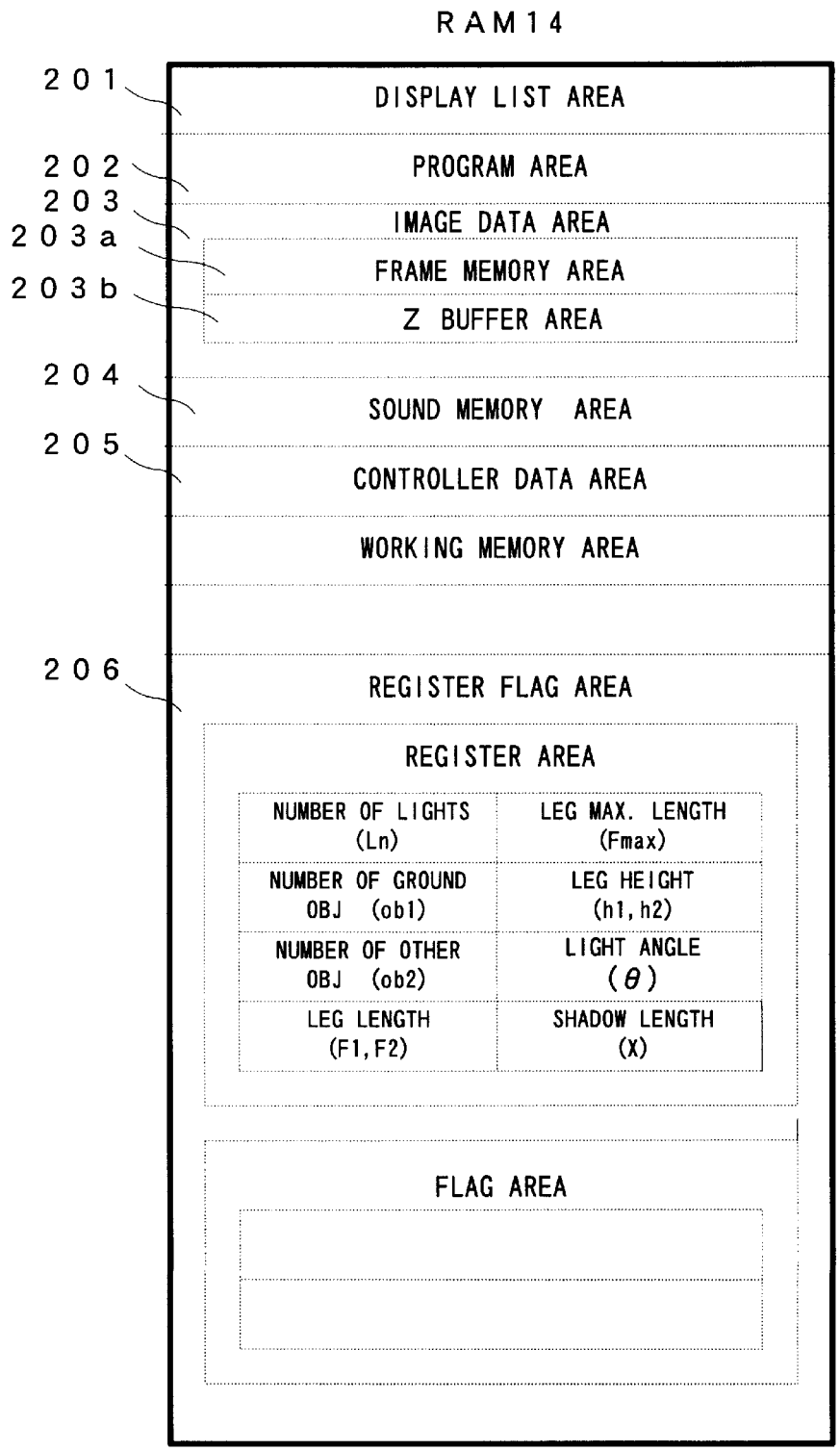
FIG. 6 is an illustrative view showing a memory map of a RAM in FIG. 2.
Figure 7:
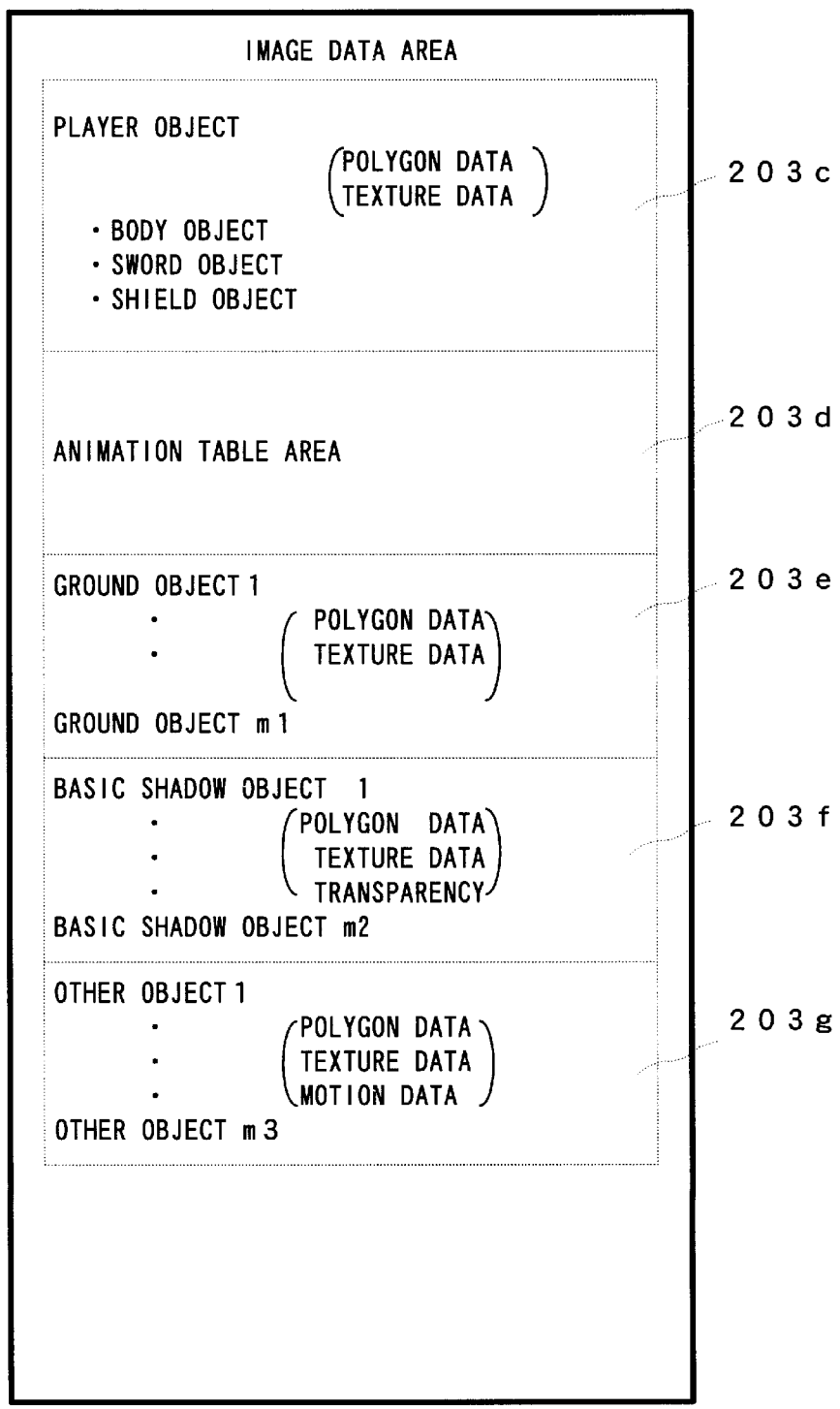
FIG. 7 is an illustrative view showing in detail an image data area included in the RAM of FIG. 6.

FIG. 6 is a memory map illustrative of a memory space of the RAM 14. The RAM 14 includes a display list area 201. When the player object or the non-player object is to be displayed, its object No. is registered in the display list area 201. The RAM 14 includes further a program area 202 and an image data area 203. The image data area 203 includes a frame memory area 203*a* to temporarily memorize 1 frame of image data, and a Z buffer area 203*b* to memorize, dot by dot, depth data of the frame memory area. The image data area 203 further includes, as shown in FIG. 7, a player object image data area 203*c*, an animation table area 203*d*, a ground object image data area 203*e*, a basic shadow object image data area 203*f* and an other-object image data area 203*g*. The areas 203*c*–203*g* each temporarily memorizes polygon data or texture data. However, the animation table area 203*d* is memorized with an animation data table as shown in FIG. 15 hereinafter referred to.

The program data area 202 is to temporarily memorize a program. The program data given on each area of the ROM 21 (FIG. 5) is temporarily memorized, as required, in the program data area 202. The CPU 11 and the RCP 12 (FIG. 2) make access to the program area thereby putting the game forward. Similarly, the image data area 203 is to temporarily memorize, as required, the image data stored in the ROM 21, which is directly accessible by the CPU 11 or the RCP 12. That is, the image data area 203 memorizes coordinate data and texture data for a plurality of polygons to constitute a stationary object and/or movable object stored, for game image display, in the external ROM 21, to which 1 course or stages of data is transferred, prior to image processing, from the external ROM 21.

A sound memory area 204 temporarily memorizes sound data of BGM or effect sound given on the sound memory area 25 of the ROM 21, as shown in FIG. 5. A controller data memory area 205 temporarily memorizes operation status data indicative of an operation status read out through the controller 40.

Also, a flag register area 206 sets a flag, or memorizes variables or constants as required, during execution of a program by the CPU 11. The registers to be set on this flag register area 206 includes a light number register (Ln) representative of the number of light sources (natural light, external light or point light) existing in one virtual three-dimensional space (scene), a ground object number register (ob1) representative of the number of ground objects on which shadows are to be displayed, an other-object number register (ob2) representative of the number of other objects, a length register (F1, F2) representative of a leg length of the player object, a length register (Fmax) representative of a maximum leg length of the player object, a height register (h1, h2) representative of a foot height of the player object, an angle register (θ) representative of an angle of light illuminated from a point light and a length register (X1, X2) representative of a length of a shadow to be displayed.

Figure 8:
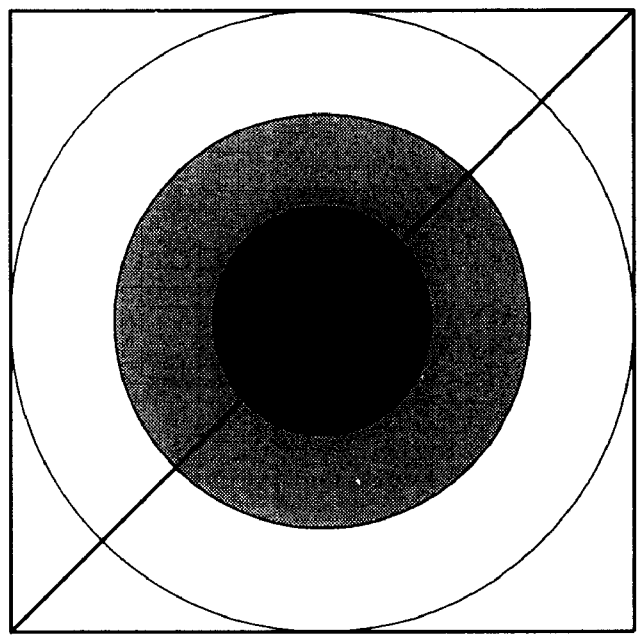
FIG. 8 is an illustrative view showing polygons for a basic shadow object.

The basic shadow object image data area 203*f* shown in FIG. 7 is memorized, for example, with the polygon data or texture data of a basic shadow object, shown in FIG. 8. That is, the basic shadow object is in a circular form represented by two sets of polygons, wherein this embodiment has texture data that gives three steps of depth (transparency) degrees. The shadow is highest in depth and hence lowest in transparency at a central portion thereof. The respective portions has transparency stepwise increased with decrease in depth as the center of the shadow is gone distant. In this embodiment, the basic shadow object is deformed in each scene so that a shadow object can be created and displayed on a ground for the player object in an realistic fashion. This satisfies at the same time the requirements of relieving the burden of calculation and providing versatility in displaying shadows.

Figure 9:
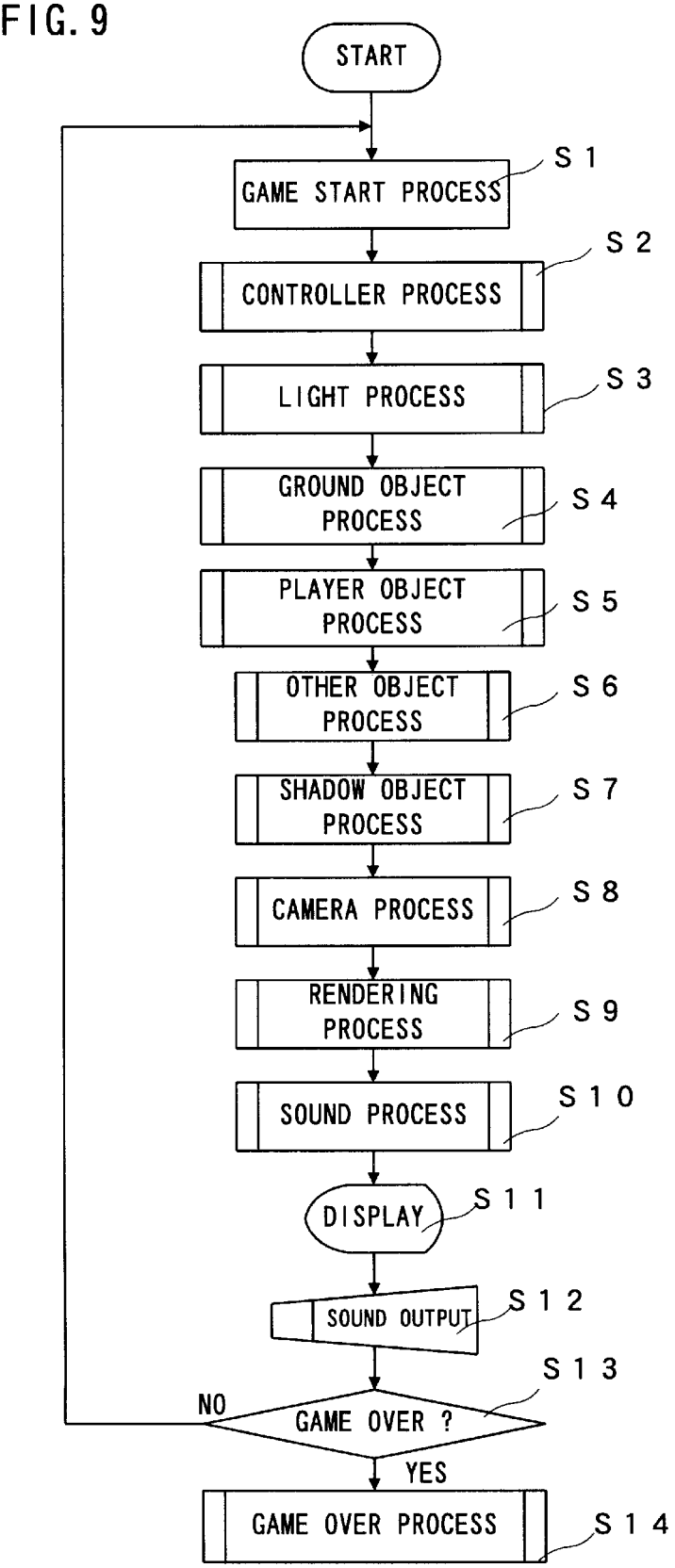
FIG. 9 is a flowchart showing an overall operation of the FIG. 1 embodiment.

FIG. 9 is a main flowchart for the video game system in this embodiment. When a power is turned on, the CPU 11 at a first step S1 sets the video game machine 10 to a predetermined initial state in order to start operation. For example, the CPU 11 transfers a start program among the game programs stored in the program area 22 of the external ROM into the program area 202 of the RAM 14, and sets each parameter to an initial value and executes the steps of FIG. 9 in the order.

The operation of the main flowchart of FIG. 8 is executed, for example, every 1 frame (1/60 second) or every two or three frames, wherein steps S1–S13 are repeatedly executed before the course is cleared. If the game becomes over without success of course clear, a game-over process is effected at a step S14 following the step S13. If course clear is successfully done, the process returns from the step S13 to the step S1.

That is, at a step S1 a game course screen and/or course opting screen is displayed. However, when the game is started after turning on the power, a first course screen is displayed. If the first course is cleared, a next course is set on.

At a step S2 following the step S1, a controller process is performed. This process includes a detection on any of which the joystick 45, cross switch 46 and switches 47A–47Z on the controller has been operated. The operation state detection data (controller data) is read in, and the controller data, thus read is written into the controller data area 205 of the RAM 14.

At a step S3, the positional data of a light for illuminating the player object, e.g., a point light or external light (natural light), is processed. For example, the number of light sources to illuminate the player object is written into the light number register Ln, and further, the image data of a light object other than the natural light is written from the image data area 24 (FIG. 5) of the RAM 21 into the image data area 203 of the RAM 14. If there is a light object, that light object is registered in the display list area 201 of the RAM 14.

Figure 10:
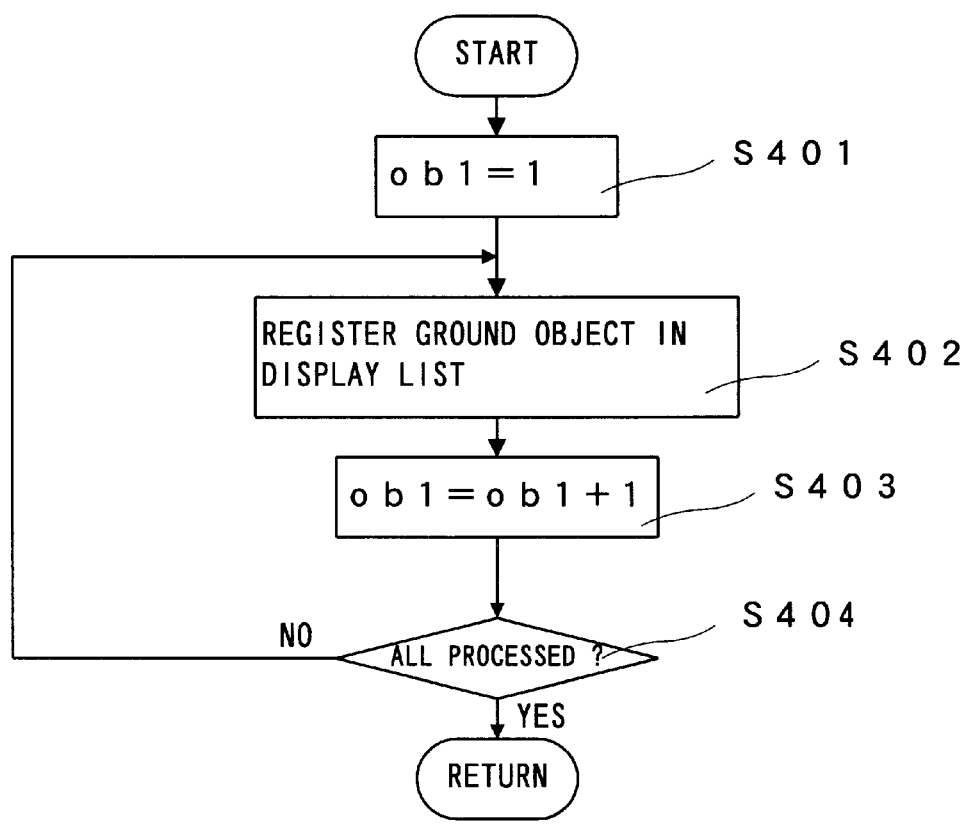
FIG. 10 is a flowchart showing in detail a ground object processing routine in the FIG. 8 embodiment.

At a step S4 a process for displaying a ground object is carried out. This step S4 is executed concretely by a subroutine shown in FIG. 10. At a first step S401 in FIG. 1, the ground object number register ob1 is set at "1". At a next step S402 the ground object is registered in the display list area 201 (FIG. 6). At a step 403 the ground object number register ob1 is incremented. Then it is determined at a next step S404 whether all the ground objects have been registered in the display list area 201. If "NO" at the step S404, the process returns to the step S402 to repeat the steps S402 and S403 until the process for the ground object is ended.

Figure 11:
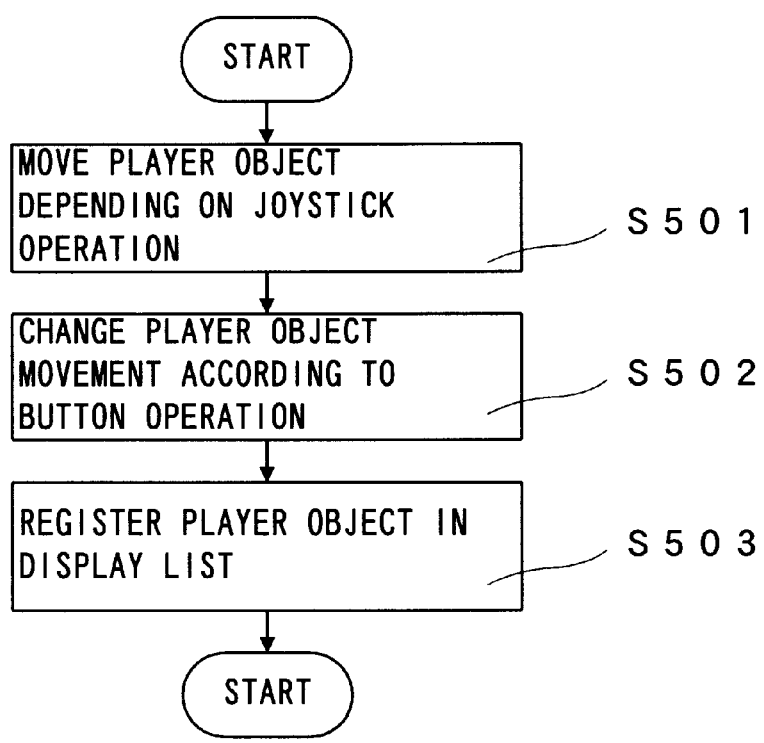
FIG. 11 is a flowchart showing in detail a player object processing routine in the FIG. 8 embodiment.

At a step S5 a process for displaying a player object is carried out. This process is concretely executed by a subroutine of FIG. 11. At a first step S501 in FIG. 11, the player object is moved in position based on an operating state of the player-operated joystick 45 and cross key 46 or a program transferred from the memory area 22*f* (FIG. 6) of the external ROM 21 and the polygon data for the player object transferred from the memory area 24, i.e. an operating state of the joystick 45 and cross key 46. At a next step S502 the player object is changed in movement in response to a button 47 operating state (controller data) on the controller 40. The polygon data after changing the movement is determined by calculation. At a step S503 the player object is registered in the display list area 201.

At a step S6 a process for other objects is carried out. This step includes calculation of a position or shape of an other object based on a program partly transferred from the memory area 22*h* and the polygon data of the other object transferred from the memory area 24 (FIG. 5).

At a step S7 a process for displaying a shadow object is carried out. This step S7 is executed concretely by a subroutine shown in FIG. 12.

Figure 12:
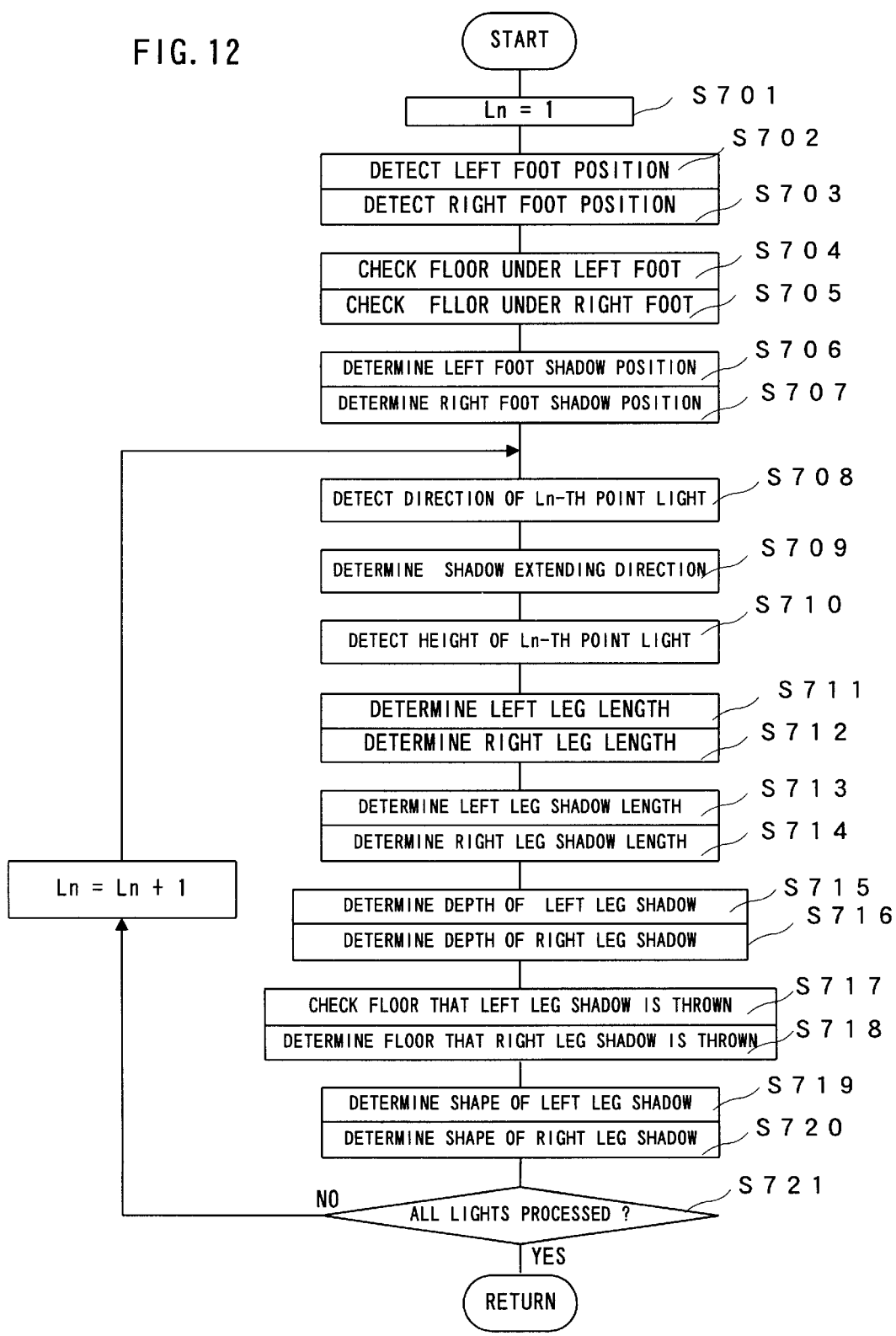
FIG. 12 is a flowchart showing in detail a shadow object processing routine in the FIG. 8 embodiment.
Figure 13:
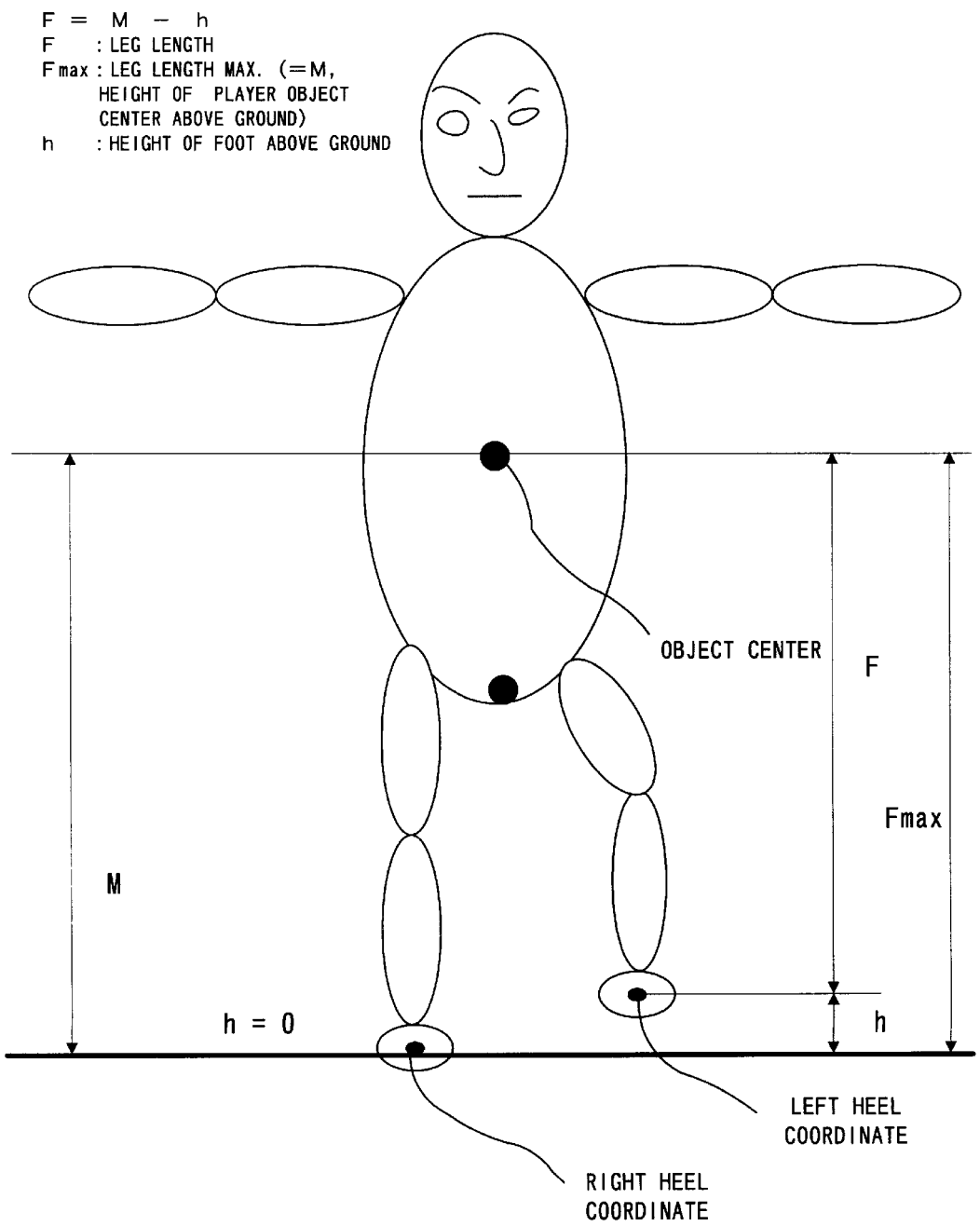
FIG. 13 is an illustrative view showing various elements of a player object.

At a first step S701 in FIG. 12, the CPU 11 (FIG. 2) sets "1" in the light number register Ln of the RAM 14. At next steps S702 and S703 the left and right feet are detected in position. Where the player object is the one as shown in FIG. 13, the CPU 11 detects a coordinate (x1, y1, z1) of a left heel and a coordinate (x2, y2, z2) of a right heel respectively at steps S702 and S703.

At next steps S704 and S705 the CPU 11 checks on floors (ground objects) respectively existing under the left and right feet based on the image data of the ground object image data area 203*e* in FIG. 7. Specifically, checks are made on positions, inclination and materials (water, soil, etc.) of the ground objects.

At steps S706 and S707 the left and right foot shadows are respectively determined in position. In these steps S706 and S707, the foot shadows are determined in position respectively by changing, only in (height) "y", the heel coordinate positions (x1, y1, z1) and (x2, y2, z2) detected at the afore-said steps S702 and S703.

Subsequently, at a step S708 the CPU 11 detects a direction of the light designated at the afore-said step S701. For example, the coordinate position of a point light is detected based on the image data stored in the other-object image data area 203*g* (FIG. 7) of the RAM 14.

At a step S709 a direction to which the shadow of the player object is to be extended is determined. The coordinate position of a center of the player object (FIG. 13) is read out of the player object image data area 203*c* and then at a step S708 the point light is detected in coordinate position. Accordingly, the direction in which a shadow is to be extended is given as an opposite side to a line connecting between the coordinate positions of that center and the point light. Assuming, with reference to FIG. 14, that the player object OBJ is being irradiated by light from a behind thereof, the shadow of the player object will extend in a forward direction thereof on a line connecting between the player object and the light. That is, the direction of the shadow is determined such that the shadow extends in an opposite direction to the light on the line connecting between the light and the player object.

Figure 14:
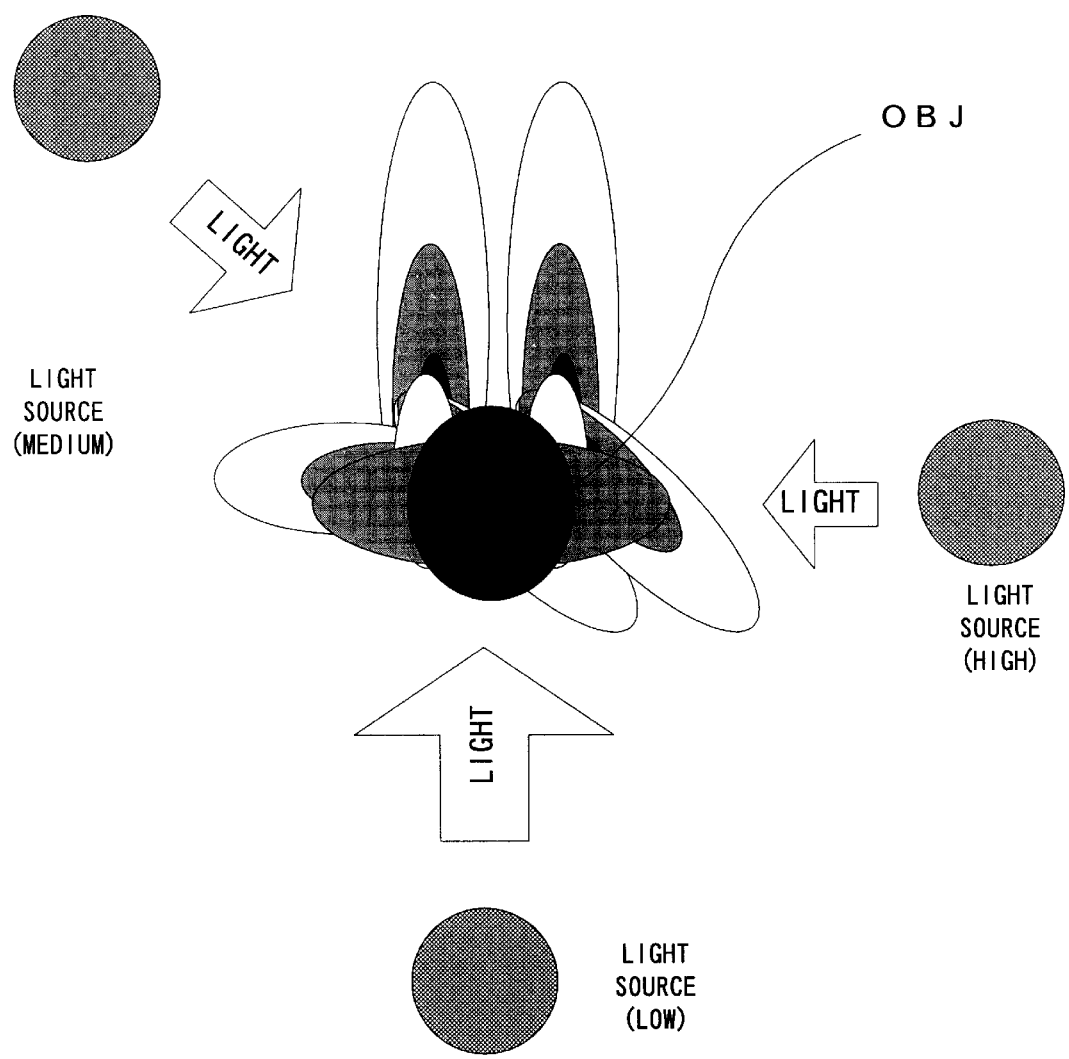
FIG. 14 is an illustrative view showing how a player object shadow varies depending upon a difference in light source height position.

At a next step S710 the point light having designated at the step S701 is detected of its height. Because the coordinate position of the point light has been detected at the step S708, the step S710 is to detect only "y" (height) data at the coordinate position. The reason of detecting the point light height is that, as shown in FIG. 14, the length of the player object shadow varies depending upon the height i.e., "high", "medium" or "low", of the point light.

At next steps S711 and S712, determinations are respectively made on a left leg length (F1) and a right leg length (F2) respectively. For the player object shown in FIG. 13, each leg length F is given by Equation 1.

$$F = Fmax - h \qquad [\text{Equation 1}]$$

where Fmax is a maximum value (maximum length) in leg length and h is a height of the foot with respect to a ground.

In the FIG. 13 example, the maximum value Fmax in leg length is given by a height of the center of the player object with respect to a ground surface.

Note that the maximum value Fmax of each foot length may be given by a distance between the ground surface and a leg root.

The steps S711 and S712 may be effected by, besides determining a leg length by Equation 1, setting previously an animation table as shown in FIG. 15 in the animation table area 203*d* in FIG. 7 and then reading out leg length data corresponding a player object to be displayed. In the FIG. 15 example, the animations 1 to 12 represent changes in size or position of the player object, wherein when the player object is for example in the animation 1, the right leg length and the left leg length are both set at "20".

Figure 16:
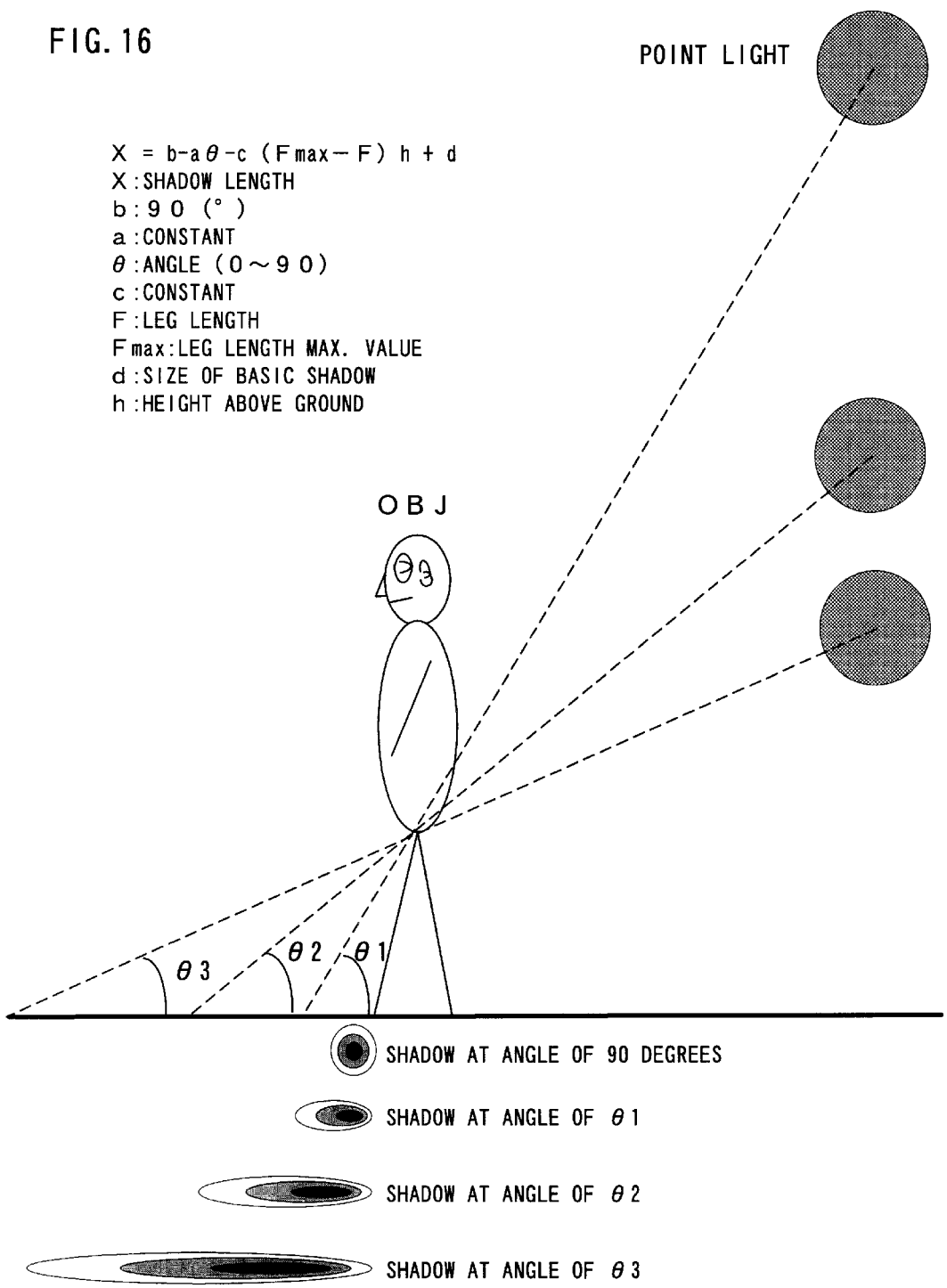
FIG. 16 is an illustrative view showing in detail a relationship between the light source height and shadow length.

At next steps S713 and S714, a left leg shadow length (X1) and a right leg shadow length (X2) are determined according to Equation 2, based on the point light height detected at the afore-said step S710 as well as the leg length (F) determined at the steps S711 and S712.

$$X = b - (a \times \theta) - c(Fmax - F)x + d \qquad [\text{Equation 2}]$$

where X is a shadow length, b is 90 degrees, a is a constant, θ is an illumination angle of the point light shown in FIG. 16, c is a constant and d is a size of a basic shadow object. Incidentally, the constants a and c are both "1" in this embodiment.

The illumination angle θ of the point light is an angle given by a line with respect to a ground surface, connecting between the point light and the leg root (or player object center) of the player object. The angle is 90 degrees when the point light illuminates the player object from an above thereof. The angle θ is varied as θ1, θ2, θ3 by varying the height position of the point light from an immediately above the player object up to the leg root (or center) of the player object.

Figure 17:
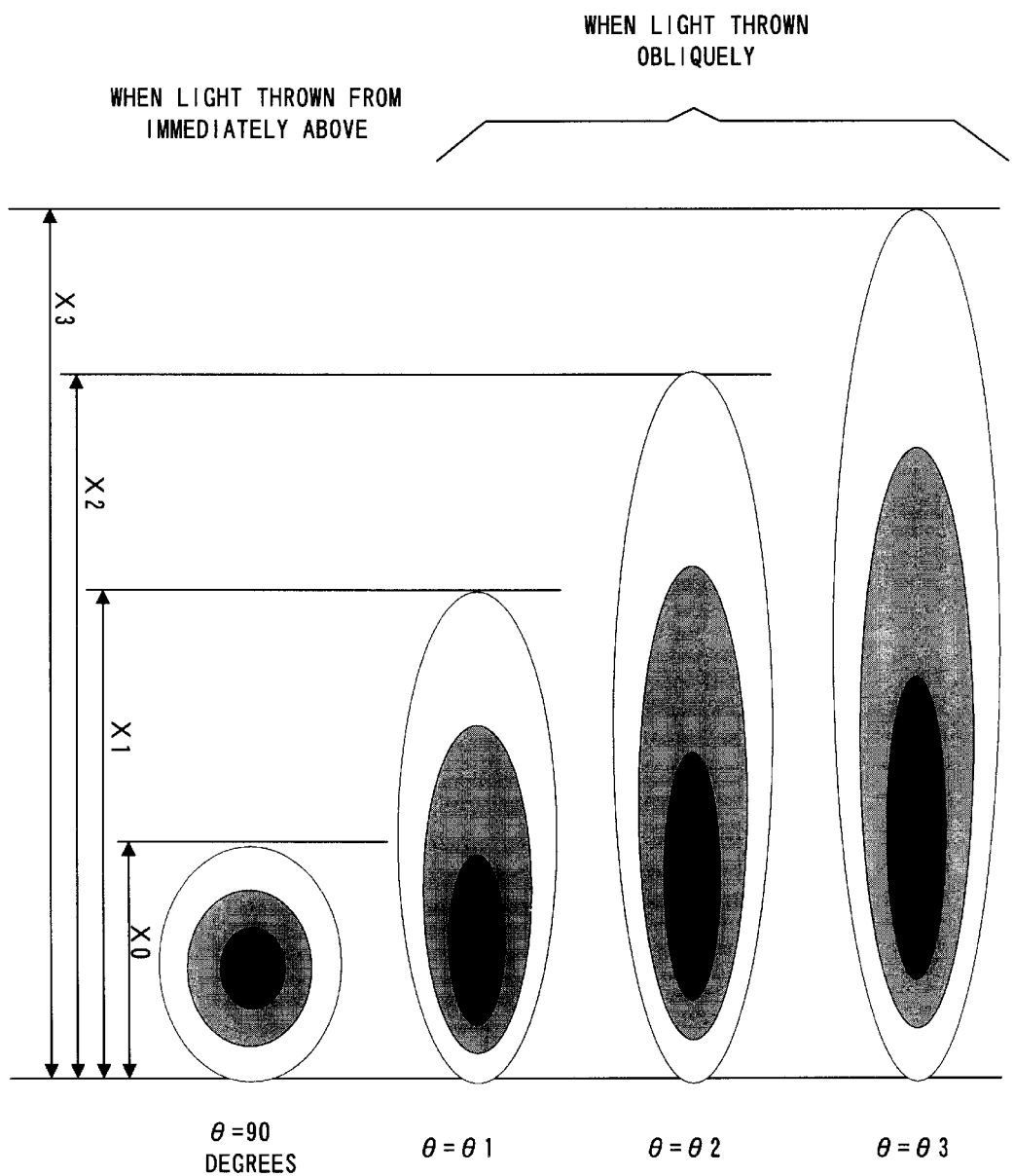
FIG. 17 is an illustrative view showing in detail differences in shadow length.

When the point light is at an immediately above the player object, the shadow length X0 is the same as that of the basic shadow object as shown in FIG. 17. The shadow length gradually increases as X1, X2, X3 . . . with the gradual decrease in the angle as θ1, θ2, θ3, . . . .

At steps S715 and S716, the left and right shadows are respectively determined of depth. When the left leg is lifted for example as shown in FIG. 13, the shadow of the left leg is projected light as compared to the shadow of the right leg as shown on the right in FIG. 18. That is, the shadow depth is lightened when the height h is high, and the depth is darkened when the height h is low. In order to change the shadow depth, the transparency data stored in the basic shadow object image data area 203$f$ is changed. That is, the change of shadow depth requires change of transparency.

Figure 19:
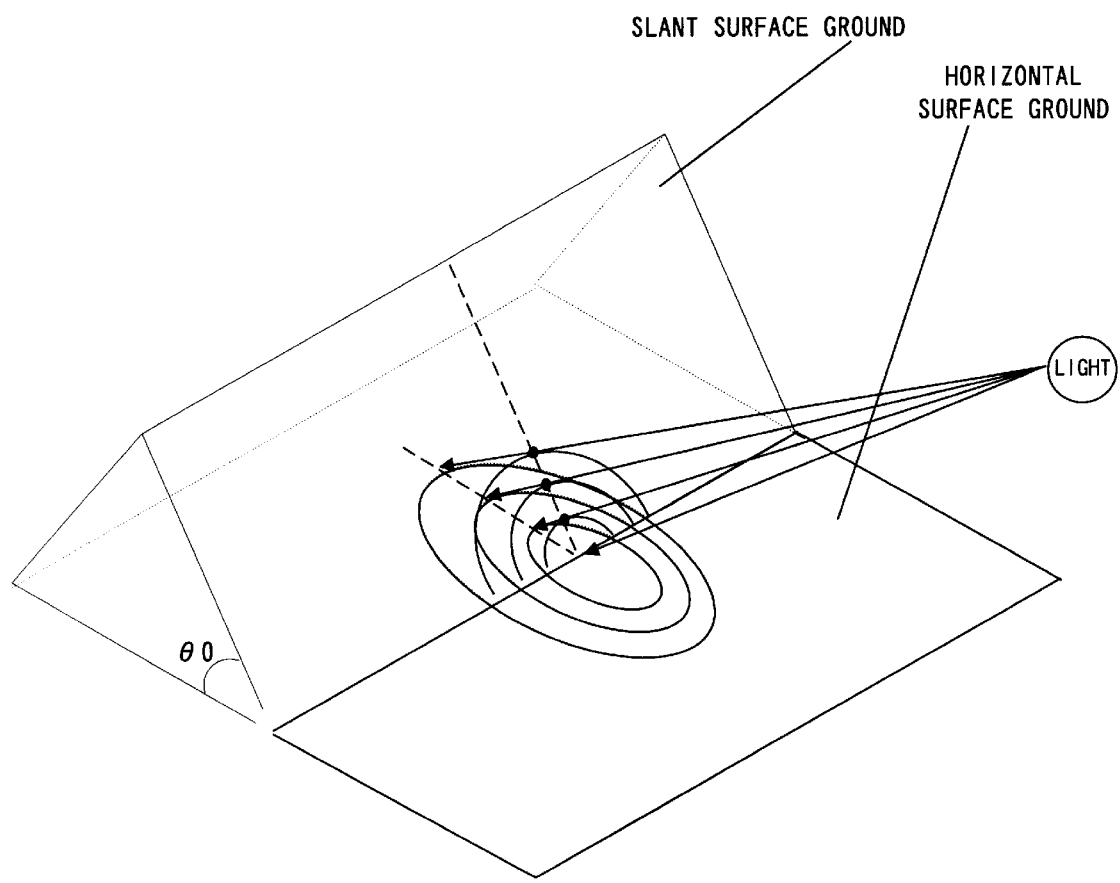
FIG. 19 is an illustrative view showing one example of a shape of a shadow projected onto a ground.

At steps S717 and S718, checks are made on states of floors (ground objects) on which the left and right leg shadows are respectively thrown. The ground object, e.g. a step, slant or material, onto which the left and right foot shadows are cast is detected of state based on the data of the ground object image data area 203$e$ (FIG. 7). At steps S719 and S720, the shapes of the left and right foot shadows are respectively determined by taking the detected state of the ground object into account. Where a shadow is thrown onto a slant ground object as shown in FIG. 19, the shape of the shadow is shortened depending on the inclination angle θ0. That is, when the ground object to which a shadow is thrown is slanted, the shadow length determined at the steps S713, S714 is modified. Specifically, the top position of the shadow object (polygon) is to be changed in accordance with the slant angle. In this manner, a displaying shadow object to be finally displayed is determined at the steps S719 and S720, and then registered in the display list area 201 (FIG. 6).

The steps S708–S720 are repeatedly executed until the process of the step S721 is completed for all the light souces. That is, if the number of the light sources, including natural light, for creating shadows for the player object is two or more in number, displaying shadow objects due to these lights are created in accordance with light source positions, player object states, etc.

Figure 20:
FIG. 20 is an illustrative view showing a shadow displayed in an actual game scene.

FIG. 20 shows an example of a concrete game screen wherein a shadow S1 is being displayed by a light L1 while another shadow S2 is being displayed by a light (natural light) positioned behind the player object and not shown on the display screen.

Returning to FIG. 9, at a step S8 a camera process is performed. For example, a visual point coordinate is calculated for each object so that a line or field of sight as viewed through a camera finder assumes an angle as designated through the joystick 45 by the player. The position (visual point) or the sight line direction of a hypothetical camera is controlled basically by operating the joystick 45.

Figure 21:
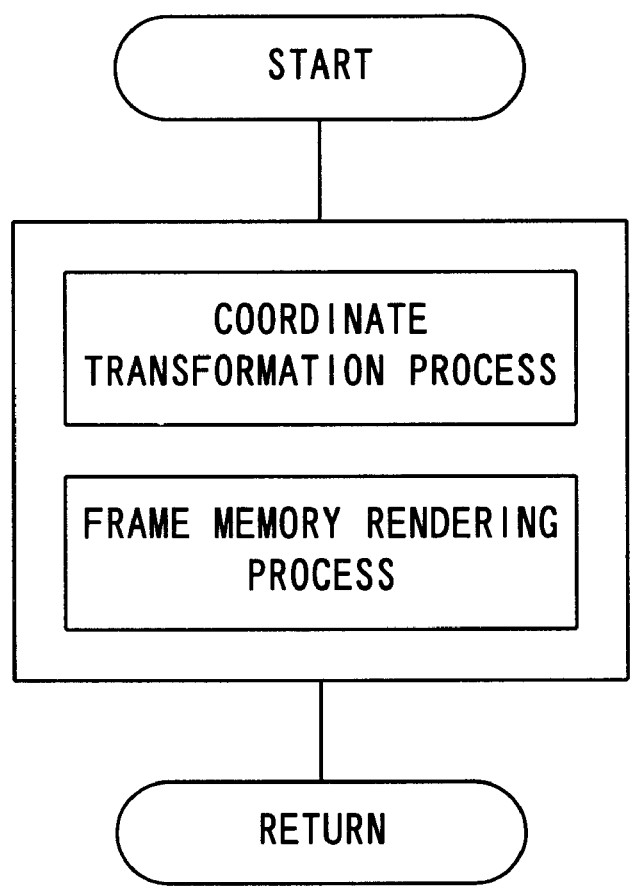
FIG. 21 is an illustrative view showing a rendering process routine of the FIG. 9 embodiment.

At a step S9 the RSP 122 executes a rendering process. That is, the RCP 12 performs transformation (coordinate transformation and frame memory rendering shown in FIG. 21) on the image data to display movable or stationary objects under the control of the CPU 11, based on the texture data for the movable objects, such as the enemy objects, player object or displaying shadow objects as well as the stationary objects, such as the backgrounds stored in the image data area 203 of the RAM 14. Specifically, colors are given to polygons for each of the movable and stationary objects.

At a step S10 the CPU 11 performs a sound process based on sound data, such as a message, music and effect sound.

At a step S11 the CPU 11 reads out the image data having been memorized by the step S7 rendering process in the frame memory area of the RAM 14. Due to this, a player object, shadow object, non-player object such as a movable or stationary object, enemy object or the like, is displayed on a screen of the display unit 30 (FIG. 1, FIG. 2).

At a step S12 the sound data having been sound processed at the step S18 by the RCP 12 is read out, thereby outputting sound such as music, effect sound, speech, etc.

At a step S13 it is determined whether the course has been cleared or not (course clear detection). If the course has not been cleared, then it is determined at a step S14 whether it is game over or not. If not game over, the process returns to the step S2 to repeat the steps S1–S14 until a game over condition is detected. If it is detected of under a game over condition that the number of mistakes permitted for the player is reached by a predetermined number of times or the life of the player object is consumed by a predetermined amount, then at succeeding step S14 is effected a game over process, such as of a selection to continue a game or memorize back up data.

Incidentally, if a course clear condition (e.g. defeating a boss, or the like) is detected at the step S13, the course clear process is effected and then a process returns to the steps S1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for displaying a shadow with a video game apparatus, including the steps of:
   (a) generating basic shadow object data;
   (b) deforming the basic shadow object data to create displaying shadow object data according to at least position data of a light and player object data; and
   (c) supplying an image signal to a display unit based on at least the player object data on a player object and the displaying shadow object data.

2. A method for displaying a shadow according to claim 1, wherein the step (b) is to create the displaying shadow object data according to ground object data for a ground to which the player object data shadow is thrown and the light position data.

3. A method for displaying a shadow according to claim 2, wherein the step (b) is to create the displaying shadow object data based on a state of the ground object.

4. A method for displaying a shadow according to claim 3, wherein the step (b) is to determine a length of the shadow based on the position data on the light and the player object, and to deform the basic shadow object data based on the length of the shadow and the state of the ground object.

5. A method for displaying a shadow according to claim 4, wherein the player object includes a ground contact portion contactable with the ground object, and the step (b) being to determine the length based on positions of the ground contact portion and the light.

6. A method for displaying a shadow according to claim 1, wherein the basic shadow object data includes depth data for the shadow, and the step (b) being to detect a height of the ground contact portion with respect to the ground object existing immediately thereunder, and to change the depth data depending upon the height.

7. A method for displaying a shadow according to claim 6, wherein the step (b) is to change in transparency of the basic shadow object.

8. A method for displaying a shadow according to claim 1, wherein the player object has at least two legs, and the step (b) being to create, for the two legs, first displaying shadow object data and second displaying shadow object data.

9. A video game apparatus, comprising:

a basic object data generator for generating basic shadow object data;

a player object image data generator for generating a player object data;

a displaying shadow object data creator for deforming the basic shadow object data to create displaying shadow object data according to at least the player object data and position data on a light for illuminating the player object; and an image processor for supplying an image signal to a display unit based on at least the player object data and the displaying shadow object data.

10. A video game apparatus according to claim 9, further comprising a ground object data generator for generating ground object data for a ground object to which the displaying the shadow object is thrown, wherein the displaying shadow object data creator creates the displaying shadow object data based on the ground object data.

11. A video game apparatus according to claim 10, further comprising a state detector for detecting a state of the ground object based on the ground object data, wherein the displaying shadow object data creator creates the displaying shadow object data based on the state of the ground object.

12. A video game apparatus according to claim 11, wherein the displaying shadow object data creator includes a length determiner for determining a length of a shadow based on the light position data and the player object data, to deform the basic shadow object data based on the length of the shadow and the state of the ground object.

13. A video game apparatus according to claim 12, wherein the player object includes a ground contact portion contactable with the ground object, and the length determiner determining the length based on positions of the ground contact portion and the light.

14. A video game apparatus according to claim 9, further comprising a height detector for detecting a height of the ground contact portion with respect to the ground object existing immediately thereunder, wherein the basic shadow object includes depth data for the shadow, and the displaying shadow object data generator including a depth changer for changing the depth data depending upon the height.

15. A video game apparatus according to claim 14, wherein the depth changer includes a transparency changer for changing in transparency of the basic shadow object.

16. A video game apparatus according to claim 9, wherein the player object has at least two legs, the displaying shadow object data creator including, for the two legs, a first data creator for creating first displaying shadow object data and a second data creator for creating second displaying shadow object data.

17. A memory medium to be detachably attached to a video game apparatus for displaying a shadow of a player object, comprising:

a first memory area for generating basic shadow object data;

a second memory area for generating player object data;

a displaying shadow object creating program for deforming the basic shadow object data to create displaying shadow object data according to at least the player object data and position data of a light for illuminating the player object; and an image processing program for supplying an image signal to a display unit based on at least the player object image data and displaying shadow object data.

* * * * *